United States Patent
Oliebos et al.

(10) Patent No.: US 11,703,068 B2
(45) Date of Patent: *Jul. 18, 2023

(54) PISTON LOCK SYSTEM FOR AGRICULTURAL EQUIPMENT

(71) Applicant: CNH Industrial America LLC, New Holland, PA (US)

(72) Inventors: Tim Oliebos, Eke (BE); Stijn Bailliu, Eernegem (BE); Bjorn Depoortere, Zwevezele (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/946,663

(22) Filed: Sep. 16, 2022

(65) Prior Publication Data

US 2023/0145934 A1 May 11, 2023

Related U.S. Application Data

(63) Continuation of application No. 17/520,234, filed on Nov. 5, 2021, now Pat. No. 11,473,600.

(51) Int. Cl.
*F15B 15/26* (2006.01)
*A01D 41/14* (2006.01)
(Continued)

(52) U.S. Cl.
CPC .......... *F15B 15/261* (2013.01); *A01D 41/145* (2013.01); *A01D 75/20* (2013.01);
(Continued)

(58) Field of Classification Search
CPC .............. F15B 15/261; F15B 2015/267; F15B 2211/7107; A01D 41/145; A01D 75/20; E02F 3/388
See application file for complete search history.

(56) References Cited

U.S. PATENT DOCUMENTS 3,215,292 A * 11/1965 Halls .................... E02F 3/3405
414/707
3,730,362 A *  5/1973 Hurlburt ................ E02F 3/388
414/697
(Continued)

FOREIGN PATENT DOCUMENTS

DE        102004042126 A1    3/2006

OTHER PUBLICATIONS

Entire patent prosecution history of U.S. Appl. No. 17/520,234, filed Nov. 5, 2021, entitled, "Piston Lock System for Agricultural Equipment."

*Primary Examiner* — Dustin T Nguyen
(74) *Attorney, Agent, or Firm* — Peter Zacharias

(57) ABSTRACT

A piston lock system having first and second cylinders, first and second pistons telescopically connected to the cylinders, and first and second piston locks. The piston locks are movable in a transverse direction within a planar region between the cylinders, between unlocked positions in which the piston locks are not located between the free ends of the cylinders and the free ends of the piston, and locked positions in which the piston locks are located between the free cylinder ends and the free piston ends. A control link is operatively connected to the piston locks, and configured to simultaneously move the piston locks between the locked and unlocked positions.

16 Claims, 7 Drawing Sheets

(51) Int. Cl.
*A01D 75/20* (2006.01)
*E02F 3/38* (2006.01)

(52) U.S. Cl.
CPC ......... *E02F 3/388* (2013.01); *F15B 2015/267* (2013.01); *F15B 2211/7107* (2013.01)

(56) References Cited

U.S. PATENT DOCUMENTS

| | | |
|---|---|---|
| 3,995,761 A | 12/1976 | Hurlburt |
| 4,529,215 A | 7/1985 | Strand |
| 9,380,744 B2 | 7/2016 | Dilts |
| 2007/0294990 A1* | 12/2007 | Coers ................... A01D 41/145 56/10.2 E |
| 2020/0217104 A1 | 7/2020 | Hunt et al. |

* cited by examiner

PISTON LOCK SYSTEM FOR AGRICULTURAL EQUIPMENT

This application is a continuation of U.S. application Ser. No. 17/520,234, filed on Nov. 5, 2021, which is incorporated herein by reference.

BACKGROUND OF THE INVENTION

Agricultural equipment, such as combine harvesters that are used to gather agricultural crops, typically have a header that is configured to remove the crop material from the ground, and a feeder housing that conveys the crop material to the main body of the vehicle for processing and temporary storage. The feeder typically is encased in a feeder housing, which may be connected to the vehicle chassis by hydraulic cylinders, in order to allow the header to move relative to the chassis. At times, it may be necessary to extend the hydraulic cylinders to raise the header out of contact with the ground. For example, it may be desirable to raise the header during road transport and other non-harvesting movements, and to allow service of the header and related parts. Under these circumstances (and especially during service), it may be desirable to lock the feeder in the raised position to inhibit accidental lowering of the feeder and header.

One way to lock the feeder in the raised position is to place a blocking member around the piston member of a hydraulic actuator that connects the feeder (and thus the header) to the vehicle chassis. For example, a lock in the form of a rigid rod or shaft having an open slot along the side can be slipped over the piston when it is extended from the cylinder, with the ends of the lock terminating adjacent to the two exposed ends of the piston. One end of the lock rests against the end face of the cylinder, and the other end of the lock rests against the end fitting of the cylinder (or another adjacent structure, such as a clevis into which the end fitting is installed), thereby preventing the piston from retracting into the cylinder.

It is also known to connect multiple cylinder locks to each other, such that they can be simultaneously moved into place over respective pistons. U.S. Pat. No. 4,529,215, which is incorporated herein by reference, discloses a cylinder lock member in the form of two straps that are pivotally connected to the free end of the piston. Multiple lock members may be connected to each other by a pivot shaft that extends between the cylinder assemblies. In use, the lock members rotate out of the plane defined by the cylinder assemblies. This requires a large clear space adjacent to the cylinder assemblies, and limits or prohibits the applicability of this mechanism when there is no free space to allow the lock members to rotate. Thus, such a mechanism is only feasible when there is sufficient room for the system.

While various cylinder lock mechanisms are known, it has been found that they can be cumbersome and time-consuming to operate, and may not have sufficient strength to hold large modern headers and feeders.

This description of the background is provided to assist with an understanding of the following explanations of exemplary embodiments, and is not an admission that any or all of this background information is necessarily prior art.

SUMMARY OF THE INVENTION

In one exemplary aspect, there is provided a piston lock system comprising: a first cylinder extending from a first fixed cylinder end to a first free cylinder end; a second cylinder extending from a second fixed cylinder end to a second free cylinder end, wherein the first cylinder and the second cylinder are spaced in a transverse direction to define a planar region therebetween; a first piston telescopically connected to the first cylinder and extending through the first free cylinder end from a first sliding piston end contained in the first cylinder to a first free piston end located outside the first cylinder; a second piston telescopically connected to the second cylinder and extending through the second free cylinder end from a second sliding piston end contained in the second cylinder to a second free piston end located outside the second cylinder; a first piston lock movably connected to the first cylinder and extending from a first proximal lock end to a first distal lock end, the first piston lock being movable in the transverse direction within the planar region between a first unlocked position in which the first piston lock is not located between the first free cylinder end and the first free piston end, and a first locked position in which the first piston lock is located between the first free cylinder end and the first free piston end; a second piston lock movably connected to the second cylinder and extending from a second proximal lock end to a second distal lock end, the second piston lock being movable in the transverse direction within the planar region between a second unlocked position in which the second piston lock is not located between the second free cylinder end and the second free piston end, and a second locked position in which the second piston lock is located between the second free cylinder end and the second free piston end; and a control link operatively connecting the first piston lock to the second piston lock, and configured to simultaneously move the first piston lock between the first locked position and the first unlocked position, and the second piston lock between the second locked position and the second unlocked position.

In another exemplary aspect, there is provided an agricultural combine comprising: a chassis configured for movement on a surface; a feeder housing pivotally connected to the chassis; and a piston lock system such as described in the foregoing aspect and examples.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Exemplary embodiments of the present invention provide piston lock systems which may be used in agricultural equipment (e.g., combines, windrowers, etc.), or in other environments. However, the invention is not limited to any particular application except as may be specifically recited in the claims.

Figure 1:
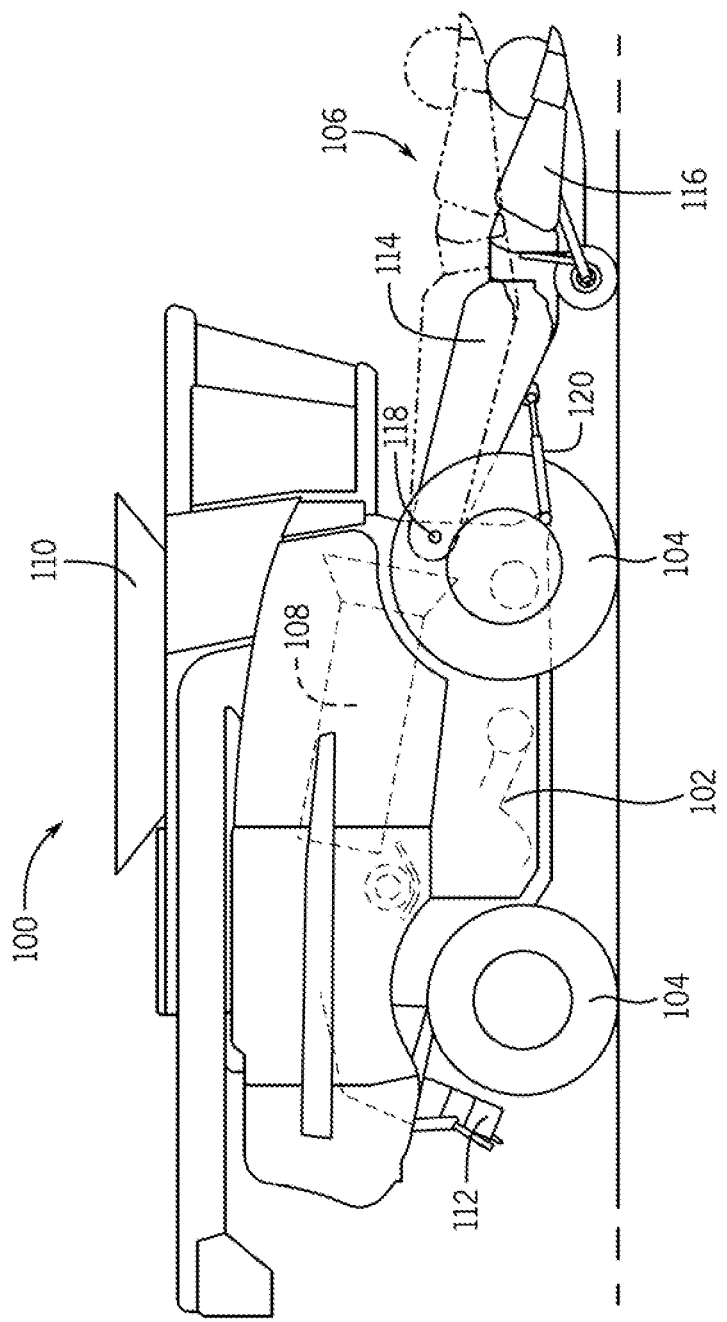
FIG. 1 schematically illustrates a side view of an example of an agricultural combine having a piston lock system such as described herein.

Referring to FIG. 1, an example of an agricultural vehicle 100, which in this case is an agricultural combine, is schematically illustrated. The vehicle 100 includes a chassis 102 that is supported for movement on the ground by wheels 104 (e.g., pneumatic tires or tracked wheels). A header assembly 106 is attached to the combine 100 and configured to receive crop material and convey such material to a threshing and separating system 108 located in or on the chassis 102. The threshing and separating system 108 separates grain from the remaining crop material (also known as "material other than grain," "MoG," or "residue"). The separated grain is stored in a hopper 110, and the MoG is evacuated to the trailing path of the vehicle 100 by a spreader 112.

The header assembly 106 comprises a feeder housing 114 and a header 116. The feeder housing 114 is pivotally connected to the chassis 102 at a horizontal pivot 118. One or more actuators 120 are connected between the chassis 102 and the feeder housing 114. Each actuator comprises a hydraulic cylinder and piston assembly with a piston lock system, such as described in more detail below.

The features described in relation to FIG. 1 are generally conventional, except for the actuators, and particularly the piston lock system, and no further explanations of their structures or operations are necessary.

Referring now to FIGS. 2A-3B, a first example of a piston lock system is shown and described in detail. The piston lock system is shown installed on a first actuator 120a and a second actuator 120b. Each actuator 120 comprises a cylinder 200 extending from a fixed cylinder end 202 to a free cylinder end 204, and a piston 206 extending through the free cylinder end 204 from a sliding piston end 208 to a free piston end 210. The sliding piston end 208 is contained in the cylinder 200, and the free piston end 210 is located outside the cylinder 200. The piston 206 is telescopically slidable relative to the cylinder 200 in a manner that is conventional in the art of hydraulic actuators. For example, a hydraulic system may include a one or more hydraulic ports 212 that are fluidly connected to the interior of the cylinder, and configured to convey pressurized hydraulic fluid to extend or retract the piston 206 relative to the cylinder 200. Such hydraulic systems are conventional, and need not be described in further detail herein.

When installed on a vehicle 100, the cylinders 200 are configured to be coplanar or parallel throughout their respective ranges of motion. When coplanar, the fixed cylinder ends 202 and free piston ends 210 all lie in a common plane. When parallel, the fixed cylinder ends 202 and free piston ends 210 all lie in a common plane, and the cylinders 200 and pistons 206 are parallel within the common plane. In either case, some variation may occur during regular use due to differential loading and slight differences in hydraulic system operations. Regardless of whether they are coplanar or parallel, the cylinders 200 are spaced from each other in a transverse direction T to define a planar region 214 between them.

Figure 2A:
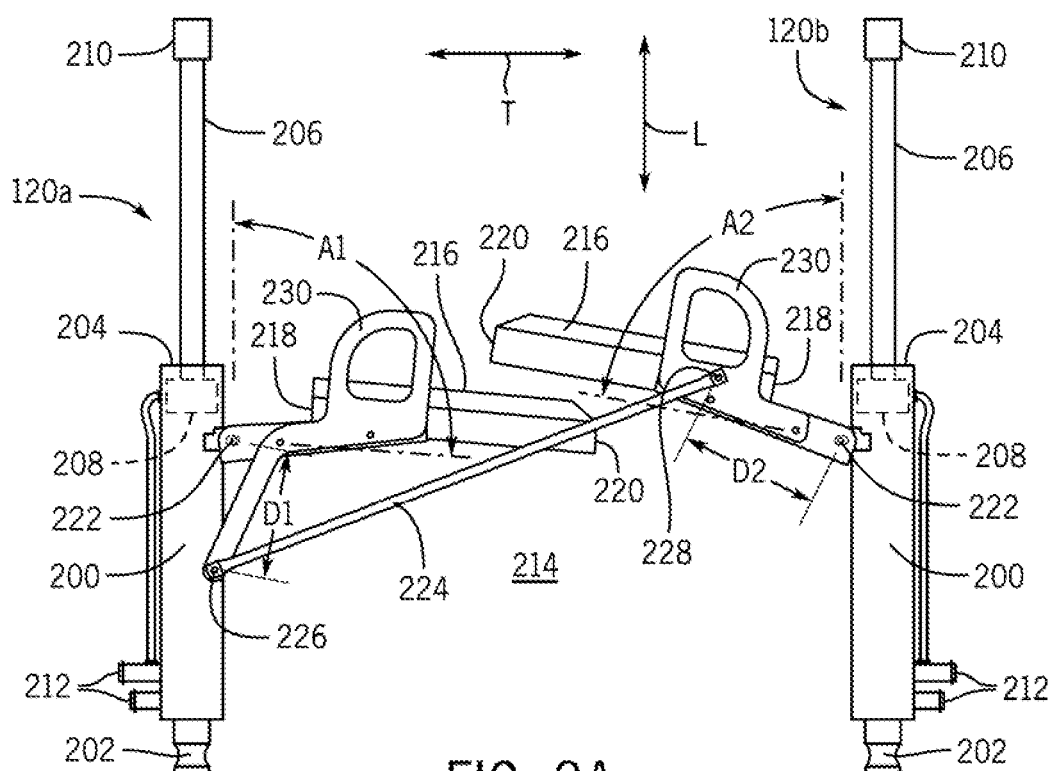
FIGS. 2A and 2B are top plan views of a piston lock system, shown in the unlocked and locked positions, respectively.
Figure 2B:
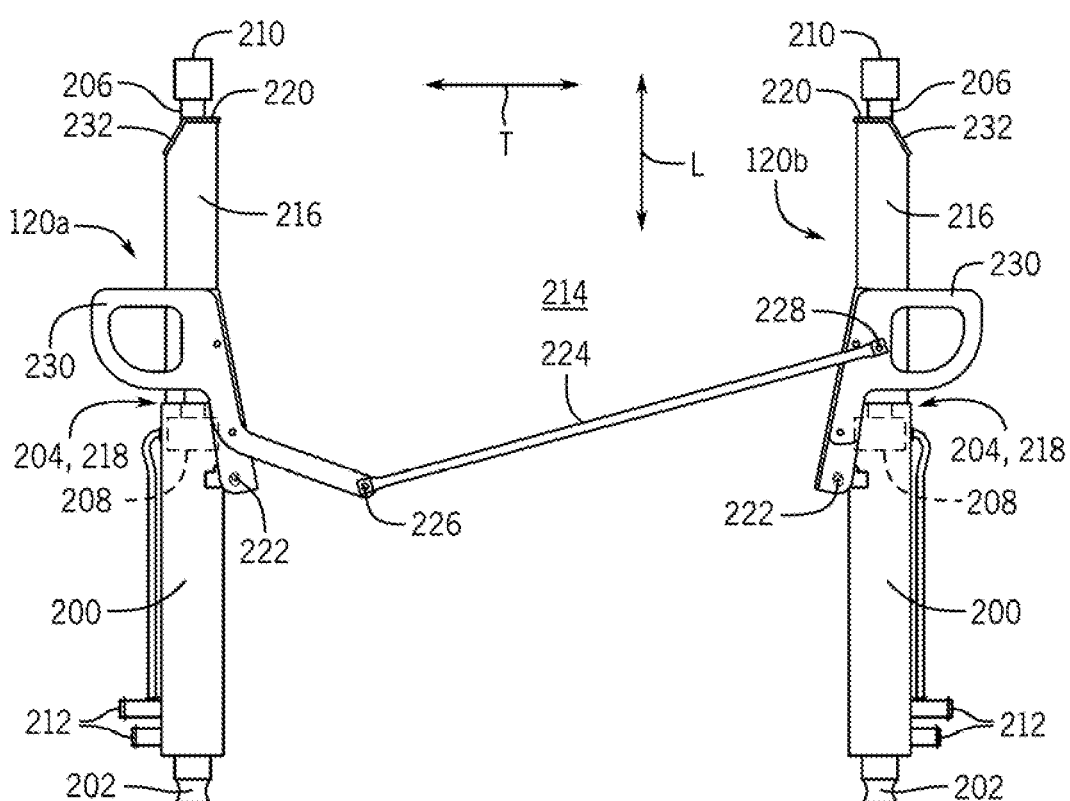
Figure 3A:
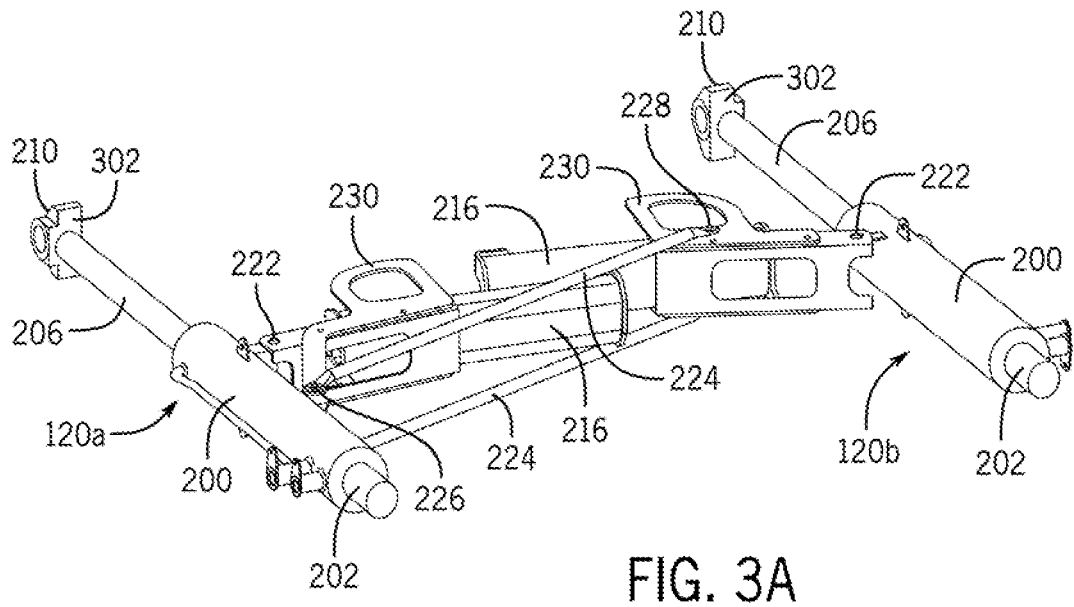
FIGS. 3A and 3B are isometric views of the piston lock system of FIGS. 2A and 2B, shown in the unlocked and locked positions, respectively.
Figure 3B:
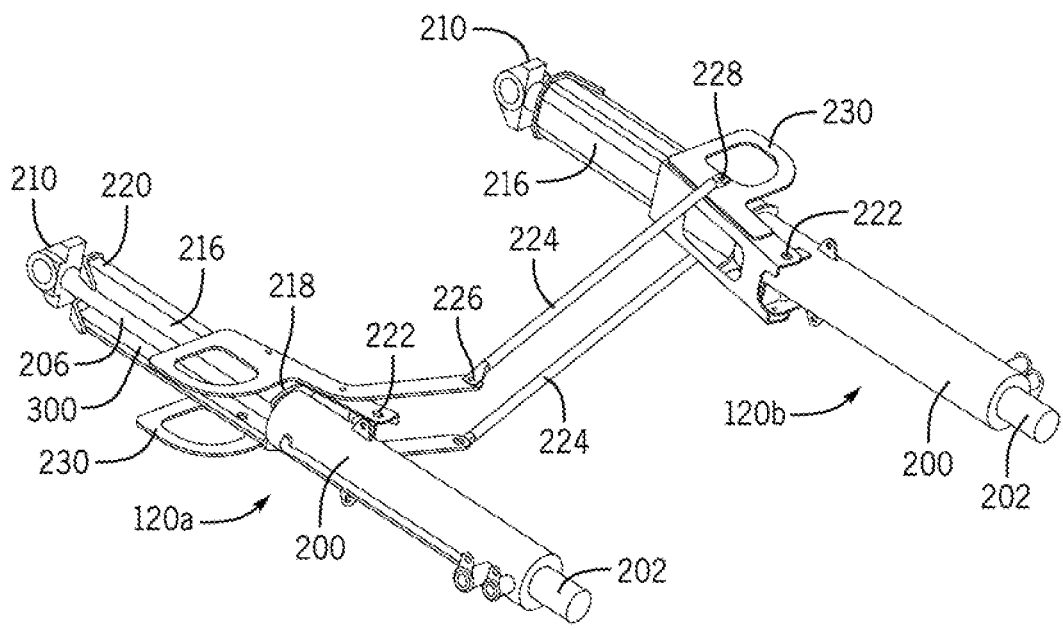

Each actuator 120a, 120b has a respective piston lock 216 that is movably connected to the cylinder 200, to move between an unlocked position (FIGS. 2A and 3A) and a locked position (FIGS. 2B and 3B). In their unlocked positions, the piston locks 216 are not located between the free cylinder end 204 and the free piston end 210, and thus do not inhibit retraction of the piston 206 into the cylinder 200. In their locked positions, however, the piston locks 216 are located between the free cylinder end 204 and the free piston end 210, and prevent retraction of the piston 206 into the cylinder 200.

As used herein, the "unlocked position" and the "locked position" are understood to be the final extents of travel of the piston locks 216. It will be appreciated that the piston locks 216 may still effectively lock the pistons 206 in some range of travel just before reaching the "locked position," and may not lock the pistons 206 in some range of travel before reaching the "unlocked position."

Each piston lock 216 extends from a proximal lock end 218 to a distal lock end 220, and is configured to withstand loads that might otherwise move the pistons 206 back into the cylinders 200. For example, each piston lock 216 may be formed as a simple round or square bar, or as a bar having a more complex profile shape, such as an L-shape or an I-shape. In the shown example, the piston locks 216 are formed with a C-shaped profile, having a slot 300 (FIG. 3B) that extends from the proximal lock end 218 to the distal lock end 220. The slot 300 is dimensioned to surround opposite sides of the piston 206 when the piston lock 216 is in the locked position.

The piston locks 216 of both actuators 120a, 120b are connected to the respective cylinders 200 such that they move in the transverse direction T within the planar region 214 as they travel between the unlocked and locked positions. Thus, the piston locks 216 remain generally in the plane defined by the actuators 120a, 120b, and out of contact with adjacent structures. This provides a compact arrangement and takes advantage of what is normally an empty space between actuators 120 in vehicles 100 such as agricultural combines.

A control link operatively connects the piston locks 216 to each other. The control link is configured to simultaneously move the piston locks 216 between their locked and unlocked positions. Thus, the piston locks 216 operate in unison. The control link may have any suitable configuration. In the shown example, each piston lock 206 is pivotally connected to its respective cylinder 200 at a respective pivot 222, and the control link comprises a rod 224 connecting the piston locks 206 to each other. More specifically, a first end 226 of the rod 224 is pivotally connected to one piston lock 216 at a position that is offset from that piston lock's pivot 222 by a first distance D1, and a second end 228 of the rod 224 is pivotally connected to the other piston lock 216 at a position that is offset from that piston lock's pivot 222 by a second distance D2.

This control link arrangement provides a four-bar linkage with a virtual fixed bar being formed between the two piston lock pivots 222, and the relative rotation rates of the two piston locks 216 being defined by the relative values of the first distance D1 and the second distances D2. As explained in more detail below, this allows the piston locks 216 to be rotated simultaneously in the same plane within interfering with each other. Other embodiments may use other mechanisms to transfer movement of one piston lock 216 to the other piston lock 216. For example, the piston locks 216 may be connected by belts, pulleys, chains, sprockets, gears, and other power transmission devices. Other alternatives and variations will be apparent to persons of ordinary skill in the art in view of the present disclosure.

One or both of the piston locks 216 may include a handle 230 that is configured for operation by a user to move the piston locks 216 between the locked and unlocked positions. The handle 230 preferably is shaped and located to allow convenient operation by the user. For example, the handle 230 may have a loop shape, such as shown, to allow grasping at multiple positions. The handle 230 also may serve an auxiliary purpose of providing a clear visual indicator when the piston locks 216 are in the locked position. For example, the handle or handles 230 may be positioned outside the planar region 214 between the actuators 120a, 120b when the piston locks 216 are in the locked position, and inside the planar region 214 when the piston locks 216 are in the unlocked position. The handle 230 also may have a distinct color or shape to help indicate the locked or unlocked position of the piston locks 216.

Each piston lock 216 has a range of motion between its respective unlocked and locked positions. In the shown example, the piston locks 216 each rotate about a single pivot 222, and each range of motion comprises a respective angle of rotation A1, A2. In this case, one angle of rotation A1 is greater than the other angle of rotation A2. Thus, the piston lock 216 having the greater angle of rotation A1 retracts farther from the locked position to reach its unlocked position, as compared to the piston lock 216 having the smaller angle of rotation A2. As a result, when the piston locks 216 are in their unlocked positions, the piston locks 216 overlap each other in a longitudinal direction L along the planar region that is perpendicular to the transverse direction. This is beneficial in this embodiment to ensure that the piston locks 216 do not interfere (i.e., contact each other), as they travel between their respective locked and unlocked positions. To this end, the angles of rotation A1, A2, as well as the instantaneous positions of the piston locks 216 throughout their entire respective angles of rotation A1, A2, are preferably selected to prevent contact at any time during motion between the locked and unlocked positions. The different angles of rotation A1, A2 can be established, for example, by adjusting the relative magnitudes the offset distances D1, D2, and modifying other properties of the four-bar linkage formed by the control link members, as known in the art of linkage design in view of this disclosure.

In other embodiments, the angles of rotation may be identical. In such cases, interference between the piston locks 216 may be avoided by offsetting them in a direction orthogonal to the planar region 214. Such offset can be accomplished by tilting their respective pivots 222 in opposite direction to cause them to move in the orthogonal direction as they move to the unlocked position, while still remaining generally between the cylinders 200, or by shaping the piston locks 216 such that they do not interfere (e.g. forming interleaving slots or forming one to pass above or below the other. In still other cases, the cylinders 200 may be spaced far enough in the transverse direction T that contact between the piston locks 216 is not possible in any event. Other alternatives and variations will be apparent to persons of ordinary skill in the art in view of the present disclosure.

The piston locks 216 may include features to help ensure proper motion to the locked position. For example, the each piston lock 216 may have an angled face 232 (FIG. 2B) at the distal lock end 220, which is configured as a ramp to drive the free piston end 210 towards the extended position piston as the piston lock 216 is rotated to the locked position.

When the piston locks 216 are in the locked position, they prevent the piston 206 from retracting into the cylinder 200 by forming a physical obstruction between the free piston end 210 and the free cylinder end 204. To this end, the free piston end 210 may have a T-shape with a flat surface 302 facing towards the free cylinder end 204, such as shown in FIG. 3A. The flat surface 302 abuts the distal lock end 220, and the proximal lock end 218 abuts the free cylinder end 204, thus forming a direct support path, and minimizing the number of parts that must bear the weight applied to the free piston end 210. It will be appreciated that the T-shaped free piston end 210 may be modified or replaced with other shapes that are suitable to provide the necessary support.

It will also be understood that the piston locks 216 may not be as long as the full stroke of the piston 206 relative to the cylinder 200. Thus, when the piston locks 216 are in the locked position, there may be a gap between the free cylinder end 204 and the proximal lock end 218, or between the distal lock end 220 and the free piston end 210. Such a gap can be seen in the example shown in FIG. 2B. When a gap is present, the assembly can be placed into the final service position by retracting the piston 206 into the cylinder 200 until contact is made between the free cylinder end 204 and the proximal lock end 218, and the distal lock end 220 and the free piston end 210. Such contact may generate a load that holds the piston lock 216 in the locked position, or the shapes of the parts may be selected such that the piston lock 216 cannot be rotated out of the locked position once the piston is retracted, but neither of these features is strictly required.

In some cases, it may be desirable to ensure that there is full contact between the free piston end 210 and the distal lock end 220, and between the free cylinder end 204 and the proximal lock end 218. Contact between the free piston end 210 and the distal lock end 220 is readily accomplished by retracting the piston 206 until contact is made. However, contact between the proximal lock end 218 and the free cylinder end 204 may be inhibited by various factors, such as misplacement of the pivot 222, thermal expansion of the parts, wear on the parts, and so on. For example, if the pivot 222 is too close to the free cylinder end 204, the proximal lock end 218 may be unable to contact the free cylinder end 204, resulting in loads being transferred from the free piston end 210 to the pivot 222.

Figure 4:
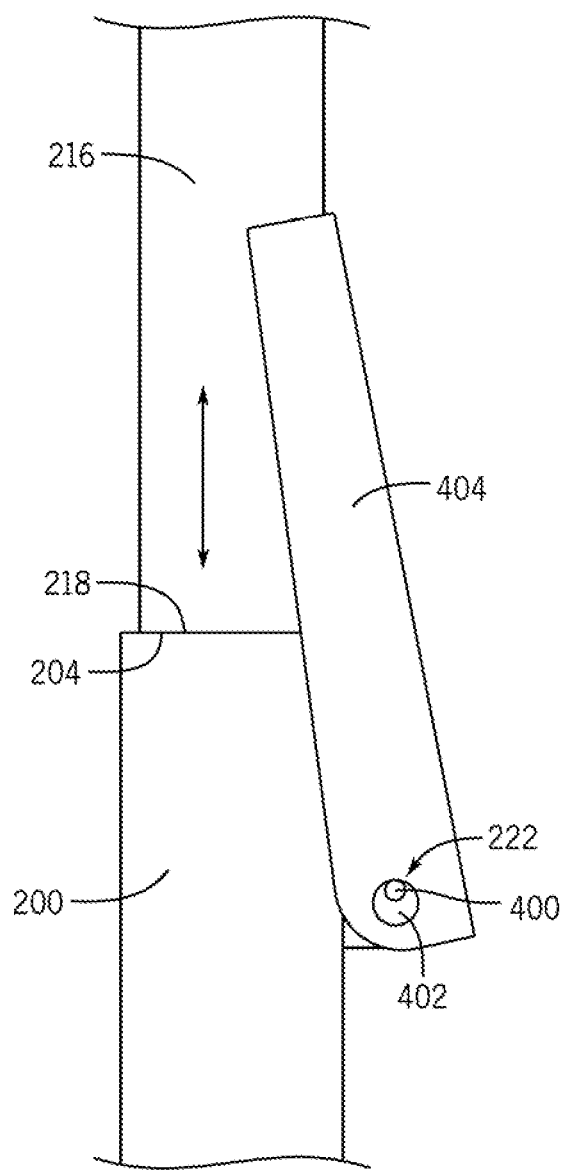
FIG. 4 is a schematic illustration of an exemplary lost motion connection between a piston lock and a cylinder.

To account for such variables, the pivot 222 may include a lost motion connection (i.e., a connection that provides limited free movement between the parts, such as a pin in a slot) that allows the proximal lock end 218 to move into contact with the free cylinder end 204 under any expected operating conditions. An example of a lost motion connection is shown in FIG. 4. Here, the pivot 222 is formed by a pin 400 that fits in a hole 402. The hole 402 is oversized— i.e., larger than the pin 400—and thus allows the piston lock 216 to move relative to the cylinder 200, as shown by the double-headed arrow. In this example, the pin 400 is fixed to the cylinder 200, and the oversized hole 402 or slot is formed in an arm 404 connected to the piston lock 216. Other embodiments may have other arrangements. For example, an oversized hole 402 or slot may be formed in a boss extending from the piston 200, and the pin 400 may be provided as a bolt that extends through the arm 404. The size of the pin 400 and hole 402 may be selected as necessary to account for manufacturing tolerances, expected wear on the parts, changes in operating conditions, and so on. The illustrated hole 402 is round, but oval, rectangular and other shapes may be used to allow relative movement at the pivot 222. Other alternatives for lost motion connections will be apparent to persons of ordinary skill in the art in view of the present disclosure.

Figure 5A:
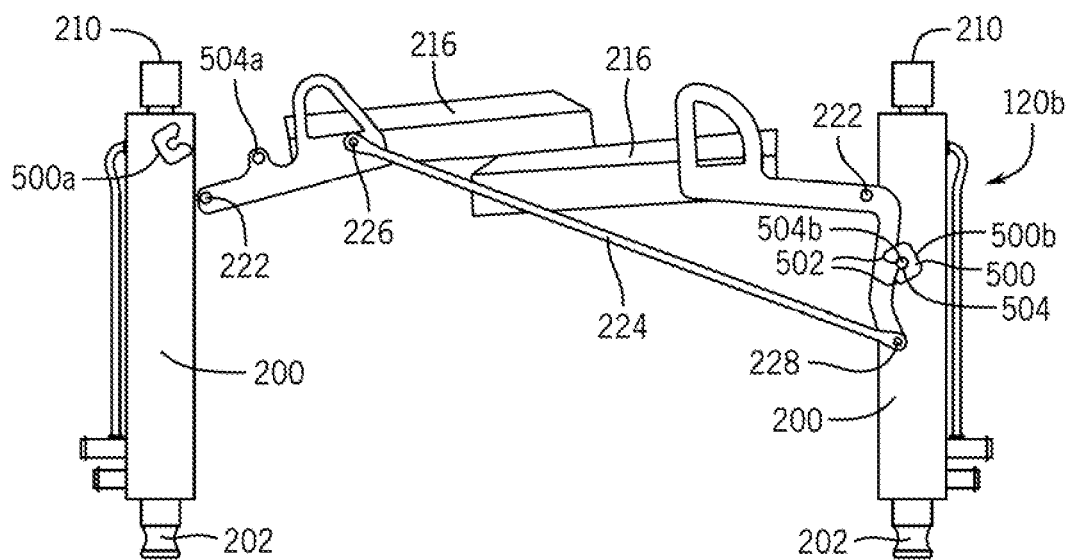
FIGS. 5A and 5B are top plan views of another piston lock system, shown in the unlocked and retracted position, and the extended and locked position, respectively.
Figure 5B:
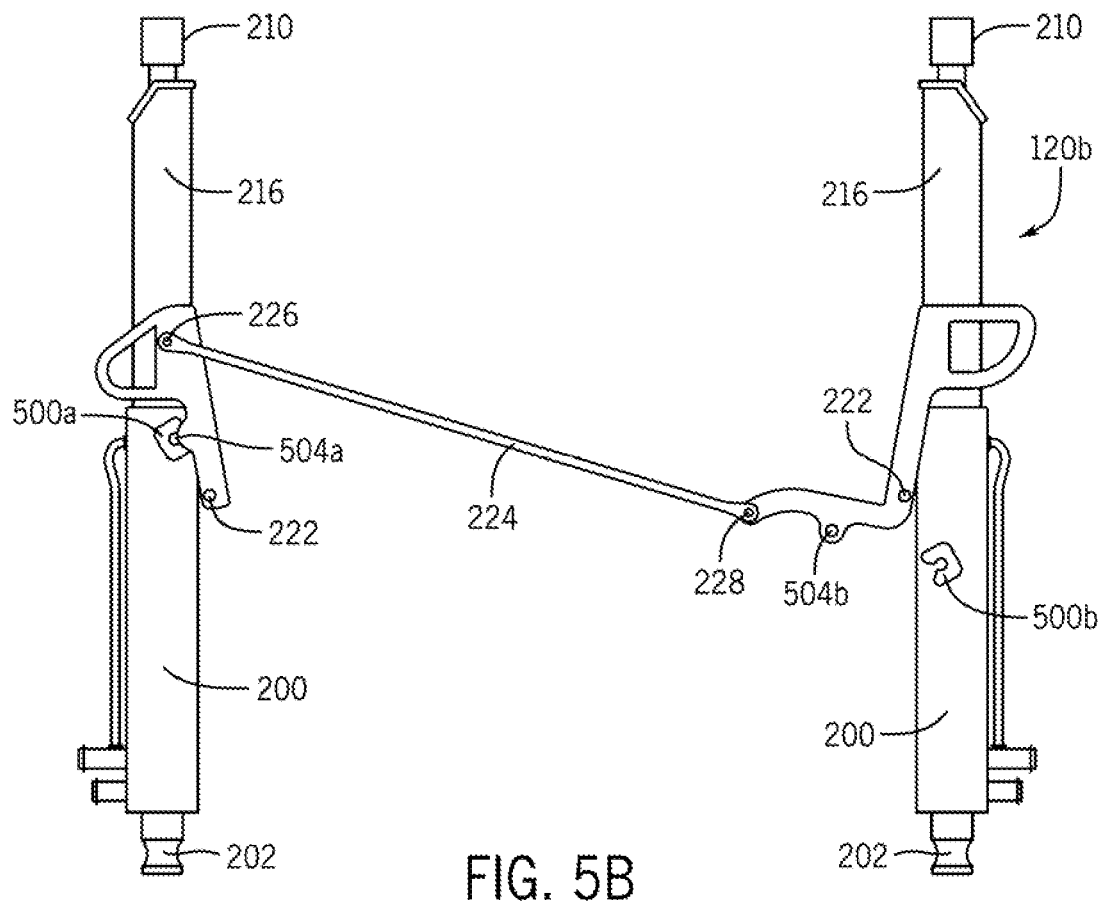

FIGS. 5A and 5B show another embodiment, in which the piston lock system includes retainers 500 to hold the piston locks 216 in one or more positions. In this case, a first retainer 500a is provided on the cylinder 200 of one actuator 120a, and a second retainer 500b is provided on the cylinder 200 of the other actuator 120b. As shown in the inset image, each retainer 500 comprises a resilient snap clip having two arms 502 that can flex away from each other to receive and hold an appropriately sized snap pin 504. A first pin 504a is provided on one piston lock 216 to engage the first retainer 500a when the piston locks 216 are in the locked position, as shown in FIG. 5B. Similarly, a second pin 504b is provided on the other piston lock 216 to engage the second retainer 500b when the piston locks 216 are in the unlocked position, as shown in FIG. 5A.

FIGS. 5A and 5B also illustrate the pistons 206 being in the telescopically retracted position (FIG. 5A) and the telescopically extended position (FIG. 5B).

Figure 6:
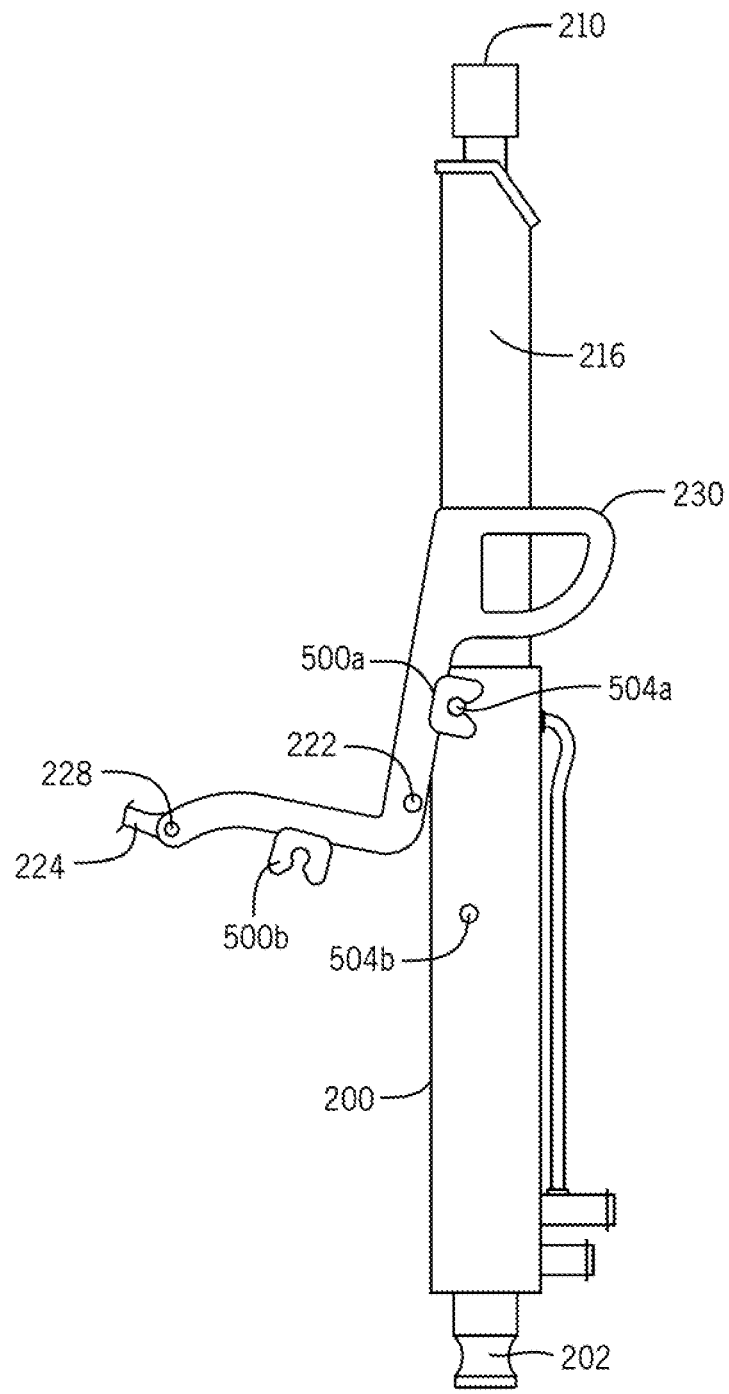
FIG. 6 is a top plan view of one actuator side of another piston lock system, with the other actuator and related parts omitted from view.

FIG. 6 illustrates another example of retainers 500 to hold the piston locks 216 in the locked and unlocked positions. In this case, both retainers 500a and 500b are provided on one piston lock 216, and configured to engage respective pins 504a and 504b on a single cylinder 200.

Other embodiments may use other arrangements of retainers to hold the piston locks 216 in one or more positions. For example, the positions of the retainers 500 and pins 504 may be reversed or moved to any suitable location. It will also be appreciated that the retainers 500 may comprise devices other than the shown resilient snap clips and snap pins. For example, the retainers 500 may comprise magnets, manually-operated hooks or pins, and so on. Other alternatives and variations will be apparent to persons of ordinary skill in the art in view of the present disclosure.

Figure 7:
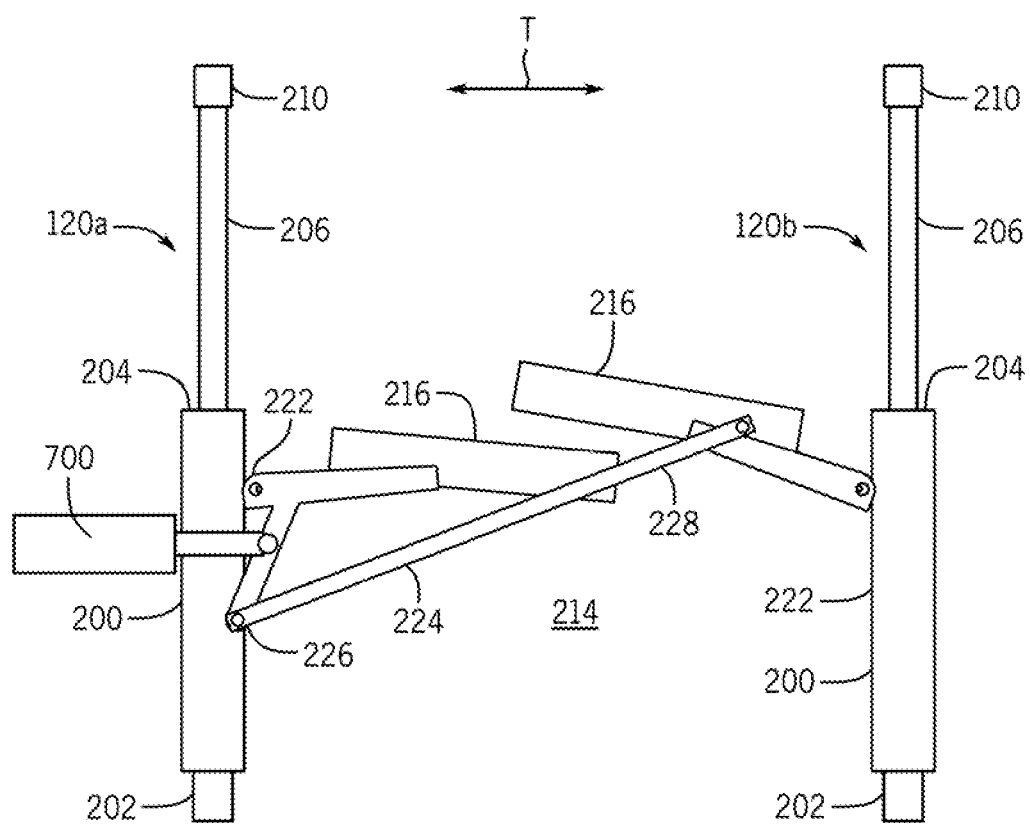
FIG. 7 is a top plan view of another piston lock system, shown in the unlocked position.

FIG. 7 illustrates another example of a piston lock system. In this case, the piston lock system is essentially the same as the embodiment of FIGS. 2A-3B, but instead of having a manually-operated handle, it has a powered actuator 700 configured to move the piston locks 216 between the locked position and the unlocked position. The actuator 700 may comprise a pneumatic, hydraulic or electric actuators (e.g. a telescoping piston and cylinder assembly), or the like. The actuator 700 is shown acting on one of the piston locks 216, but it may instead act on the rod 224 or on another link that is connected to the remaining parts.

It will be appreciated that embodiments such as describe herein can be used in various locations on agricultural vehicles and equipment, particularly those having multiple actuators. For example, the actuators 120a, 120b may be mounted with the fixed cylinder ends 202 connected to a vehicle chassis 102, and the free rod ends 210 connected to a feeder housing 114, or vice-versa. Such connections can be made in the manner of a conventional actuator, and thus embodiments may be provided as a retrofit assembly for an existing vehicle 100.

It is expected that embodiments will provide easier and more efficient options to lock pistons of actuators in the extended positions, and thus can improve serviceability and safety of such devices. Furthermore, embodiments the ability to simultaneously operate lock pins on multiple actuators can have a significant benefit in cases in which locking a single actuator is not sufficient to adequately secure a load. For example, modern agricultural combine headers having two actuators can weigh too much to be reliably held by a single one of its actuators, in which case the ability to simultaneously lock both actuators is particularly desirable.

The present disclosure describes a number of inventive features and/or combinations of features that may be used alone or in combination with each other or in combination with other technologies. The embodiments described herein are all exemplary, and are not intended to limit the scope of the claims. It will be appreciated that various aspects of the embodiments described herein may be provided as component parts or as subassemblies. It will also be appreciated that the inventions described herein can be modified and adapted in various ways, and all such modifications and adaptations are intended to be included in the scope of this disclosure and the appended claims.

The invention claimed is:

1. An agricultural equipment assembly comprising:
   a first actuator comprising a first cylinder and a first piston telescopically movable in the first cylinder;
   a second actuator comprising a second cylinder and a second piston telescopically movable in the second cylinder;
   a first lock pivotally connected to the first cylinder and movable between a first unlocked position in which the first lock does not prevent the first piston from moving relative to the first cylinder, and a first locked position in which the first lock inhibits the first piston from moving relative to the first cylinder;
   a second lock pivotally connected to the second cylinder and movable between a second unlocked position in which the second lock does not prevent the second piston from moving relative to the second cylinder, and a second locked position in which the second lock inhibits the second piston from moving relative to the second cylinder; and
   a control link operatively connecting the first lock to the second lock, and configured to simultaneously move the first lock between the first locked position and the first unlocked position, and the second lock between the second locked position and the second unlocked position.

2. The agricultural equipment assembly of claim 1, wherein at least one of:
   the first lock is connected to the first actuator by a first lost motion pivot connection; and
   the second lock is connected to the second actuator by a second lost motion pivot connection.

3. The agricultural equipment assembly of claim 1, wherein:
   the first lock comprises a first lock body that is located along a first telescopic path between a first stop surface on the first piston and a first stop surface on the first cylinder when the first lock is in the first locked condition to thereby inhibit a contracting telescopic movement of the first piston relative to the first cylinder, and the first lock body is not located along the first telescopic path when the first lock is in the first unlocked condition; and
   the second lock comprises a second lock body that is located along a second telescopic path between a second stop surface on the second piston and a second stop surface on the second cylinder when the second lock is in the second locked condition to thereby inhibit a contracting telescopic movement of the second piston relative to the second cylinder, and the second lock body is not located along the second telescopic path when the second lock is in the second unlocked condition.

4. The agricultural equipment assembly of claim 3, wherein:
   the first lock body comprises a first slot that surrounds a respective portion of the first piston when the first lock is in the first locked condition; and
   the second lock body comprises a second slot that surrounds a respective portion of the second piston when the second lock is in the second locked condition.

5. The agricultural equipment assembly of claim 1, wherein:

the first actuator and the second actuator define a planar region therebetween;
the first lock is configured to move within the planar region and towards the second actuator as the first lock moves from the first locked position towards the first unlocked position; and
the second lock is configured to move within the planar region and towards the first actuator as the second lock moves from the second locked position towards the second unlocked position.

6. The agricultural equipment assembly of claim 5, further comprising a handle connected to the first piston lock, wherein the handle is positioned outside the planar region when the first piston lock is in the first locked position.

7. The agricultural equipment assembly of claim 1, further comprising:
a hydraulic system configured to simultaneously move the first piston relative to the first cylinder and the second piston relative to the second cylinder;
a vehicle chassis; and
a feeder housing;
wherein the first actuator extends between the vehicle chassis and the feeder housing, and the second actuator extends between the vehicle chassis and the feeder housing.

8. An agricultural equipment assembly comprising:
a first actuator comprising a first cylinder and a first piston telescopically movable in the first cylinder;
a second actuator comprising a second cylinder and a second piston telescopically movable in the second cylinder;
a first lock movable between a first unlocked position in which the first lock does not prevent the first piston from moving relative to the first cylinder, and a first locked position in which the first lock inhibits the first piston from moving relative to the first cylinder;
a second lock movable between a second unlocked position in which the second lock does not prevent the second piston from moving relative to the second cylinder, and a second locked position in which the second lock inhibits the second piston from moving relative to the second cylinder; and
a control link operatively connecting the first lock to the second lock, and configured to simultaneously move the first lock between the first locked position and the first unlocked position, and the second lock between the second locked position and the second unlocked position;
wherein:
the first lock comprises a first lock body that is located along a first telescopic path between a first stop surface on the first piston and a first stop surface on the first cylinder when the first lock is in the first locked condition to thereby inhibit a contracting telescopic movement of the first piston relative to the first cylinder, and the first lock body is not located along the first telescopic path when the first lock is in the first unlocked condition, and
the second lock comprises a second lock body that is located along a second telescopic path between a second stop surface on the second piston and a second stop surface on the second cylinder when the second lock is in the second locked condition to thereby inhibit a contracting telescopic movement of the second piston relative to the second cylinder, and the second lock body is not located along the second telescopic path when the second lock is in the second unlocked condition.

9. The agricultural equipment assembly of claim 8, wherein the first lock is movably connected to the first actuator, and the second lock is movably connected to the second actuator.

10. The agricultural equipment assembly of claim 8, wherein at least one of:
the first lock is connected to the first actuator by a first lost motion connection; and
the second lock is connected to the second actuator by a second lost motion connection.

11. The agricultural equipment assembly of claim 8, wherein:
the first lock body comprises a first slot that surrounds a respective portion of the first piston when the first lock body is in the first location; and
the second lock body comprises a second slot that surrounds a respective portion of the second piston when the second lock body is in the second location.

12. The agricultural equipment assembly of claim 8, wherein the first actuator and the second actuator define a planar region therebetween, and the first lock and the second lock are configured to move within the planar region.

13. The agricultural equipment assembly of claim 12, wherein:
the first lock is configured to move within the planar region and towards the second actuator as the first lock moves from the first locked position towards the first unlocked position; and
the second lock is configured to move within the planar region and towards the first actuator as the second lock moves from the second locked position towards the second unlocked position.

14. The agricultural equipment assembly of claim 13, further comprising a handle connected to the first lock, wherein the handle is positioned outside the planar region when the first lock is in the first locked position.

15. The agricultural equipment assembly of claim 8, wherein the first lock is pivotally connected to the first actuator, and the second lock is pivotally connected to the second actuator.

16. The agricultural equipment assembly of claim 8, further comprising:
a hydraulic system configured to simultaneously move the first piston relative to the first cylinder and the second piston relative to the second cylinder;
a vehicle chassis; and
a feeder housing;
wherein the first actuator extends between the vehicle chassis and the feeder housing, and the second actuator extends between the vehicle chassis and the feeder housing.

* * * * *